April 6, 1948. F. A. FIRESTONE 2,439,130
SURFACE AND SHEAR WAVE METHOD AND APPARATUS
Filed Nov. 20, 1943 3 Sheets-Sheet 1
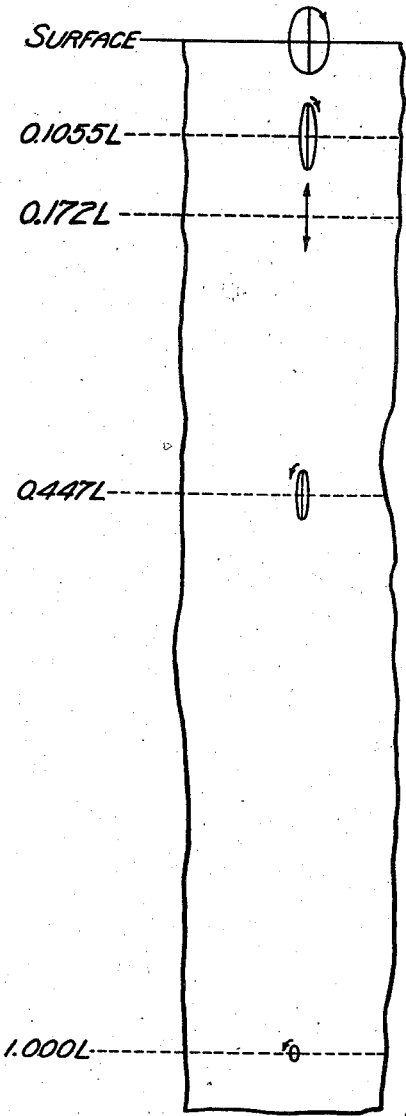
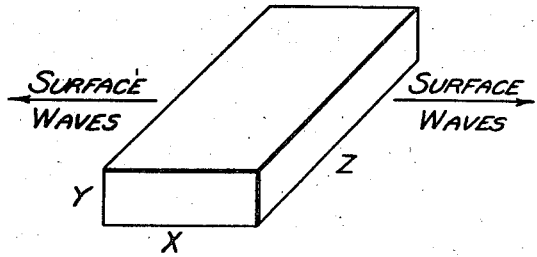
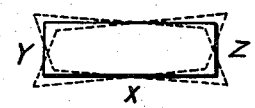
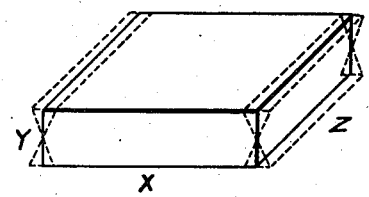
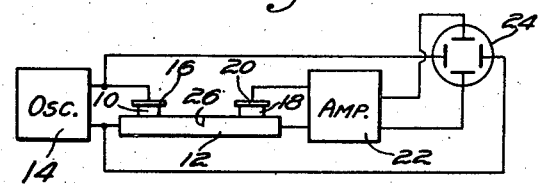
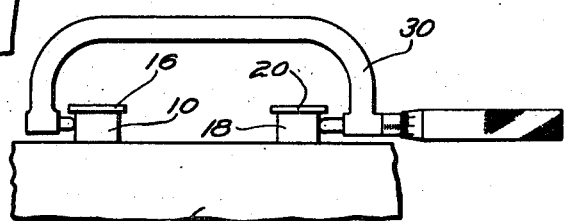
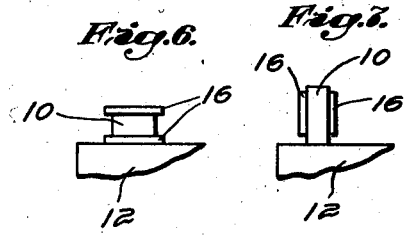
INVENTOR
Floyd A. Firestone
BY Charles L. Shelton
Attorneys April 6, 1948. F. A. FIRESTONE 2,439,130
SURFACE AND SHEAR WAVE METHOD AND APPARATUS
Filed Nov. 20, 1943 3 Sheets-Sheet 2
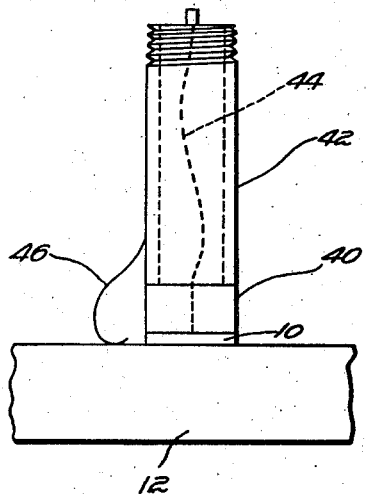
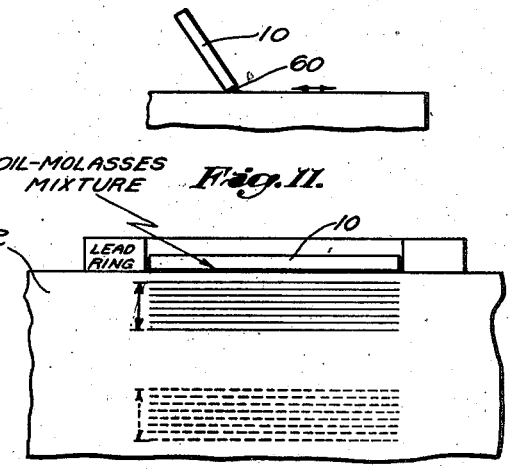
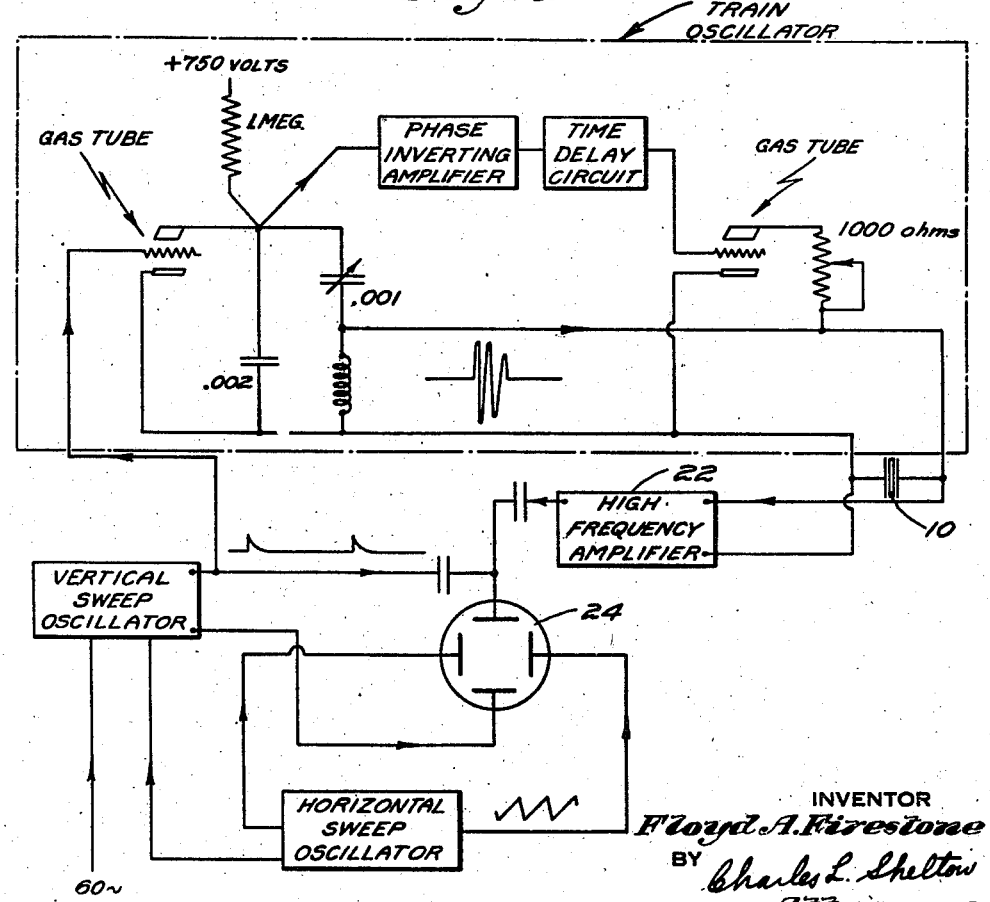
INVENTOR
Floyd A. Firestone
BY Charles L. Shelton
Attorneys

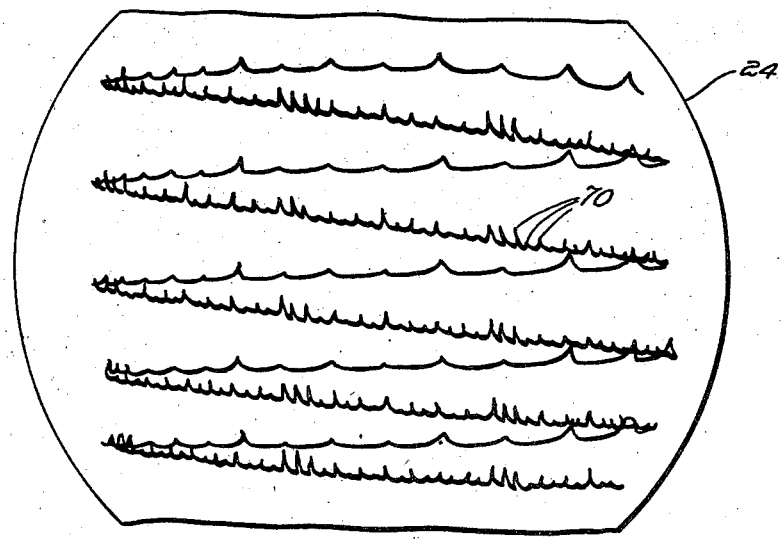
SCHEMATIC VIEW OF AN OSCILLOSCOPE PATTERN
WITH INCH MARKS SET FOR SHEAR WAVES
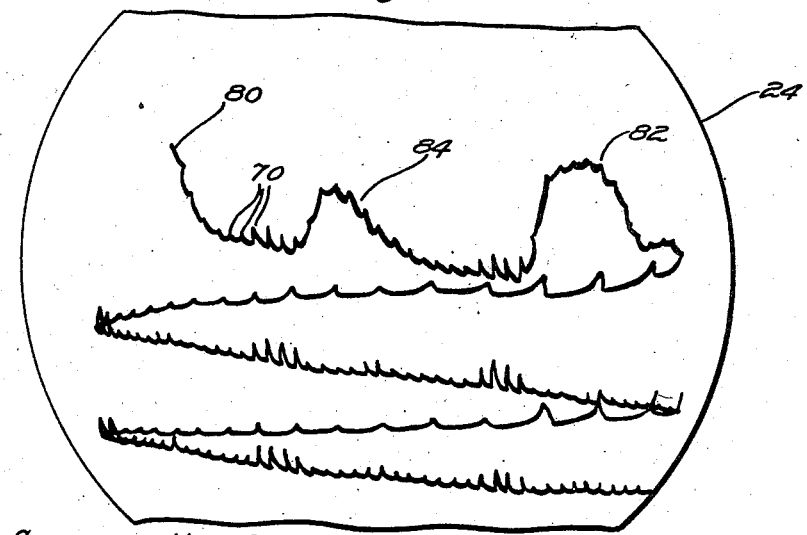
SCHEMATIC VIEW OF AN OSCILLOSCOPE SCREEN SHOWING
SURFACE WAVES REFLECTED FROM A CORNER AND FROM
LINE SCRATCHED ON THE SURFACE Patented Apr. 6, 1948

2,439,130

UNITED STATES PATENT OFFICE 2,439,130

SURFACE AND SHEAR WAVE METHOD AND APPARATUS

Floyd A. Firestone, Ann Arbor, Mich., assignor to United Aircraft Corporation, East Hartford, Conn., a corporation of Delaware Application November 20, 1943, Serial No. 511,089

39 Claims. (Cl. 73—67)

This application is a continuation-in-part of my application Serial No. 471,173, filed January 2, 1943, which is abandoned.

This invention relates to the production and utilization of specific supersonic vibration wave types, surface and shear waves, which are particularly adapted for solving special inspection problems with the supersonic reflectoscope disclosed and claimed in my Patent No. 2,280,226, granted April 21, 1942.

An object of this invention is to provide a method and apparatus for producing strong supersonic surface waves in elastic materials, particularly in solid materials such as metals, and to provide means for indicating characteristics of the passage of such waves over the surface portion of a material for determining the physical nature of the material at the surface and for a selected distance below the surface.

A further object of this invention is to provide a method and apparatus for producing strong supersonic shear waves in elastic materials, particularly in solid materials, such as metals, and to provide means for indicating characteristics of the passage of such waves through a material for determining the physical nature of the interior portion of the material.

Other objects and advantages will be apparent from the specification and claims, and from the accompanying drawings which illustrate what is now considered to be a preferred embodiment of the invention.

Fig. 1 is a diagram showing the path of displacement of particles at the surface and at various depths below the surface of a material such as aluminum, during passage of a surface wave. The depths are shown in terms of the wavelength (L) of the surface wave.

Fig. 2 is a perspective view of a quartz crystal of a form which will produce surface waves or shear waves when energized and mounted as disclosed in this application.

Fig. 3 is an end view of a crystal such as is shown in Fig. 2 showing in dotted lines the nature of vibration of such a crystal in "pure shear."

Fig. 4 is a view similar to Fig. 3 but showing a crystal vibrating in shear.

Fig. 5 is a block diagram of an electrical apparatus for producing supersonic surface waves in a material, and includes means for observing and indicating the characteristics of the wave travel through the material.

Figs. 6 and 7 are views showing variations in the application of the crystal to the material. As in the other views shown, the proportions of the crystal are not to scale but are exaggerated for the purpose of illustration.

Fig. 8 is a view showing a means for measuring relative movement between a sending and receiving crystal.

Fig. 9 is a schematic view of a typical quartz crystal mounting.

Fig. 10 is a view, similar to Figs. 6 and 7, showing an alternative way of applying the crystal to the work.

Fig. 11 is a schematic view showing a method for testing utilizing shear waves and including a surface wave absorbing means.

Fig. 12 is a partial, schematic, view of a surface and shear wave train generating apparatus.

Figs. 13 and 14 are schematic views of an oscilloscope trace respectively without and with mechanical wave indications.

While sound waves in air are of one broad type only, namely, compressional waves, there are at least five different types of waves which can travel through a metal part. These five types of waves are summarized in Table I which gives the formulas for computing their respective velocities of propagation from a knowledge of the elastic constants of the medium, and also gives the numerical values of these velocities for aluminum and 4340 steel. The compressional and transverse types of waves first mentioned are of little interest here, since they involve gross motion of the entire cross-section of the piece; these types have been mentioned principally in order to avoid confusing them with the remaining three wave types. These three wave types, namely, longitudinal, shear and surface waves travel in the metal part in much the same manner as if the part were a semi-infinite medium, at least until reflecting flaws or surfaces are encountered. The present application is concerned with two of these, surface waves and shear waves.

Table I.—Summary of wave types and their velocities of propagation

| Wave Type | Velocity Formula | Velocity, Aluminum | Velocity Steel SAE 4340 |
|---|---|---|---|
| | | In./sec. | In./sec. |
| Compressional, in a bar. | $\sqrt{E/d}$ | 201,000 | 203,000 |
| Transverse, in a bar. | $k/L \cdot \sqrt{E/d}$ | 245,000 | 256,000 |
| Longitudinal | $\sqrt{(1-r)/1+r(1-2r)} \sqrt{E/d}$ | 245,000 | 256,000 |
| Shear | $\sqrt{G/d}$ | 122,300 | 127,600 |
| Surface | Approx. $0.93\sqrt{G/d}$ | 114,000 | 118,300 |

| Symbols | Values | |
|---|---|---|
| | Aluminum | Steel SAE 4340 |
| E = Young's modulus | 71.0×10¹⁰ | 207×10¹⁰ dynes/cm.² |
| G = modulus of rigidity, shearing modulus | 26.7×10¹⁰ | 82.7×10¹⁰ dynes/cm.² |
| d = density | 2.72 | 7.84 |
| r = Poisson's ratio | 0.33 | 0.35 |
| k = radius of gyration of cross section of bar | | |
| L = wave length of sinusoidal wave | The use of these c. g. s. units yields velocity in cm./sec. | |

To the best of my knowledge, surface waves have previously been observed in solid materials only in the earth's crust following earthquakes. Because of the interest of seismologists in this type of wave, a theory of surface waves was worked out by Lord Rayleigh, and a modern version of this theory appears beginning on page 400 of the book "Theory of Elasticity" by Timoshenko, copyrighted in 1934. It is there shown theoretically that a surface wave traveling over the surface of a solid is of the general nature of a water wave in that it consists of undulations of the surface which travel along the surface. When surface waves are passing over a surface a particle at the surface moves in an elliptical orbit and the displacement penetrates below the surface, with the path of displacement varying at various depths somewhat as shown in Fig. 1. In material such as aluminum (Fig. 1), at a distance inwardly from the surface of 0.172 times the wavelength (L), the displacement of each particle is substantially linear, normal to the surface, and approximately equal to the surface amplitude. At greater depths, the displacement is again in elliptical orbits, the amplitude growing less as the depth increases, being about ¼ of the surface amplitude at a depth equal to the wavelength, about 1/40 of the surface amplitude at a depth of 2L, and about 1/400 of the surface amplitude at a depth of 3L. Unlike water waves, the velocity of surface waves in an elastic material does not depend on the wavelength but has a substantially constant value for various wavelengths of approximately $V = 0.93\sqrt{G/d}$; where G is the modulus of elasticity in shear, or the modulus of rigidity in dynes per sq. cm., and $d$ is the density in grs. per cu. cm., of the material through which the wave passes, and where V is given in cm. per sec. The coefficient 0.93 depends slightly on the value of Poisson's ratio for the material, and may vary slightly. The wavelength and the frequency of the waves are related to their velocity of propagation according to the usual equation $L = V/f$. For aluminum, V is approximately 307,000 cm./sec. or 121,000 in./sec.

Shear waves, unlike longitudinal waves, and in a manner only partially similar to surface waves, vibrate in a direction at right angles to the direction of wave propagation. The velocity of sheer waves is lower than the velocity of longitudinal waves, as shown by Table I. Furthermore, in an aeolotropic material, shear wave velocity depends upon two factors which may be independently chosen; the direction of wave propagation and the alignment or orientation of the plane of vibration of the wave relative to the material; while the velocity of longitudinal and surface waves depends only on the direction of wave propagation. This characteristic, together with the comparatively low velocity and short wave length of shear waves, I have found to be of considerable value for some material inspection purposes.

I have found surface waves to be useful when the only flaws to be detected are those which lie reasonably near the surface, or when the material is in the form of a fairly thin sheet, or when there is no surface into which longitudinal or shear waves might be transmitted; for instance, in testing the welded seam near the center of a long piece of welded tubing, surface waves may be sent around the tube. Or in testing clad metals a train of surface waves of a wave length somewhat greater than the thickness of the cladding may be sent across the sheet, a poorly bonded portion being indicated by a reflection or a shadow.

According to this invention, both surface waves and shear waves of a supersonic frequency and readily detectable amplitude can be produced in an elastic material by a method and apparatus utilizing a piezoelectric crystal, or electromechanical transducer, shown in Fig. 2 as a quartz plate. A natural quartz crystal has a hexagonal cross-section and pyramidal ends. A line running between these pyramidal ends and parallel to the principal bounding faces is called the Z axis or optic axis. There are three X axes and three Y axes at right angles to the Z axis. The X axes are parallel to the six prismatic faces which form the hexagon while the Y axes are perpendicular to those axes, there being a Y axis perpendicular to each X axis. An X-cut quartz plate has its largest plane perpendicular to an X axis while a Y-cut plate has its largest plane perpendicular to a Y axis. In utilizing either of these cuts the electrodes may be applied to the two faces of largest area by first silverplating the crystal chemically, then copper plating electrolytically, then grinding off the conducting material from the edges of the plate so that the two conducting faces are insulated from each other, and finally soldering fine connecting wires to one or both electrodes by means of a very minimum amount of solder.

The X and Y cut crystals have different piezoelectric properties as can be seen by referring to Table II which gives all of the piezoelectric constants for quartz.

Table II.—*Piezoelectric constants for quartz*

[Multiply all constants by 10⁻⁸]

| Field, statvolts/cm. | Strains | | | | | |
|---|---|---|---|---|---|---|
| | $x_x$ | $y_y$ | $z_z$ | $y_z$ | $z_x$ | $x_y$ |
| $E_x$ | 6.9 | −6.9 | 0 | −1.7 | 0 | 0 |
| $E_y$ | 0 | 0 | 0 | 0 | 1.7 | 13.8 |
| $E_z$ | 0 | 0 | 0 | 0 | 0 | 0 |

In the embodiment of my invention shown, a quartz crystal is cut from the mother crystal in such an orientation that these axes lie substantially along the principal edges of the plate as shown in Fig. 2. The shortest edge, in the direction of the thickness of the plate, is oriented along the Y axis, and the crystal may therefore be called a Y-cut crystal. The next longest edge, or width, is oriented with the X axis of the mother crystal, and the longest edge, or length of the plate, lies along the Z axis.

When such a crystal (Fig. 2) is placed in an electric field, for instance by creating a potential difference across electrodes applied to the top and bottom or XZ faces thereof, the crystal is strained or deformed in shear around the Z axis by the said field. If the direction of the field is reversed or the intensity thereof varied, the deformation of the crystal will also be either reversed or changed in magnitude. An alternating voltage applied to the electrodes will produce an oscillatory shear force on the crystal which will cause an oscillatory motion of the crystal between limits as shown in the dotted lines in Fig. 3 or Fig. 4, depending upon the manner in which supersonic waves are to be generated.

Since the Y-cut crystal has its principal faces perpendicular to the Y axis, an electrical potential applied between its electrodes produces a field $E_y$ in the Y direction and it will be seen by referring to Table II that such a field will not produce any elongations but will produce principally an $x_y$ shear, this shear taking place about the Z axis; a much smaller $z_x$ shear will also be produced. Ideally such a crystal vibrates principally in a fundamental or pure shear mode as shown in Fig. 3, the shear taking place about the Z axis, there being a single nodal line down the center of the crystal parallel to the Z axis which stands still. An approximate natural frequency of this mode of vibration can be computed from the following formula:

$$f = \frac{196,000}{d}$$

where d=the thickness of the crystal plate in centimeters. The smaller shearing mode about the Y axis is not shown.

While a shearing motion is ordinarily thought of as being similar to the motion of the leaves of a book lying on a table, when the top cover is forced toward the bound edge, it will be noted that the principle of conservation of angular momentum requires that an unsupported plate vibrate in "pure shear" as shown in Fig. 3, rather than in "simple shear" as in the example of the book. If a book floating in free space had within itself some mechanism for shearing the top cover toward the left relative to the bottom cover, the book would during this motion have a counterclockwise angular momentum; but the principle of the conservation of angular momentum states that if a body originally has zero angular momentum, then it will continue to have zero angular momentum in spite of any forces which may act within it (this does not include forces which act upon it from outside). The book as a whole must, therefore, rotate clockwise when it has the counterclockwise shear in order that the book as a whole may continue to have zero angular momentum. This results in the left side of the book going upward and the right side going downward and the resulting motion is called "pure shear" as distinguished from "simple shear." Thus, the upper and lower or XZ faces of the crystal (Fig. 3) will execute a combined rocking and shaking motion, or a combined lateral and angular movement, which is similar to the motion of a surface over which surface waves are passing.

If a crystal vibrating in this manner is contacted with the surface of a material, with the material contacting face of the crystal being free to move laterally relative to the surface of the material, then surface waves will be generated in said material, radiating generally in both directions in the line of the X axis of the crystal, or normal to the Z axis thereof. Strong surface waves may be produced in a solid material in this manner. By the term "contact" used above and hereafter, I do not necessarily mean actual physical contact. The movements of the crystal may be transmitted to the material by various means, such as through an electrode, or a light oil film. I have observed that the oscillating crystal will be most efficient as a surface wave generator when the dimension of the material contacting face of the crystal in the direction of wave propagation bears a definite relation to the wavelength of the waves produced. Thus, for best results, the X dimension of the crystal should be from about one to about ten times the wavelength of the surface waves produced, where the XZ face of the crystal is the material contacting face.

This proportion of crystal was discovered experimentally, but Fig. 3 gives some insight into a possible explanation of its superior ability to radiate surface waves. The XY end face of a crystal for radiating surface waves is shown at the right of Fig. 3. Each such XY section of this crystal executes an $x_y$ shear about the Z axis. Conservation of angular momentum, however, requires that this should be a "pure shear" as shown by the dotted parallelograms instead of a "simple shear" such as one observes in a book lying on the table when he pushes the top cover toward the bound edge. It is believed that such crystal movements are similar to the movements of the particles of a surface over which surface waves are passing, and consequently a crystal vibrating in this manner should be more efficient as a surface wave generator if the length of its X axis is made of the order of a single wavelength or a half wave length, rather than spanning a large number of surface wavelengths. However, the greater the length of the X axis of the crystal the larger the amplitude of the vibratory movements of the crystal and the greater the energy available in the form of crystal vibrations. Hence it is thought that there is an intermediate crystal width, in the X direction, of the proportions indicated above, which will be most efficient as a generator of surface waves of a given wavelength.

While the X dimension may be selected in definite proportion to the wavelength of the surface waves in the particular material in which surface waves are to be produced, it is usually sufficient to provide a certain relation between the X and Y dimensions of the crystal, for use with any of a variety of materials, because the wavelength produced is dependent on the frequency of the wave as well as its velocity, and the resonant frequency of oscillation of the crystal is approximately inversely proportional to its Y dimension or thickness. Hence the wavelength will be approximately proportional to the Y dimension of the crystal, for a given wave velocity, when the crystal is vibrated near its resonant frequency. Therefore, there will be a proportion between the X and Y dimensions of the crystal which will have the effect of providing approximately the best proportion between the X dimension of the crystal and the wavelength of the surface wave produced. I have found that the range wherein the X dimension is from about 2 to about 15 times the Y dimension is best for many materials. My present preferred ratio lies near 7, when the waves produced in aluminum by a crystal of dimensions $Y=0.68$ mm., $X=4.5$ mm., $Z=12$ mm. by an alternating potential of 300 volts, at a frequency of 2.9 megacycles per second, will produce such strong waves that a receiving crystal responsive to the waves placed several inches away from the sending crystal, will generate a potential difference of more than one volt. This is comparable with the results obtained when longitudinal supersonic waves are sent through metal by an "X-cut" crystal as disclosed in my Patent No. 2,280,226. It will be seen that in this example the wavelength of the surface wave will be about 1.06 mm., or within the preferred ratio given above for the relation between the wavelength and the X dimension of the crystal.

The length of the crystal is subject to considerable latitude of choice. Since the Z dimension is normally many wavelengths long some control of the direction and width of the wave front may be obtained by varying this dimension. The waves will be radiated generally in a "beam" whose lateral dimension is approximately equal to Z. As Z is made smaller, a great divergence of the beam can be obtained.

The axes of a Y-cut plate can be differentiated by merely noting in which direction surface waves are radiated from the crystal; this is the X direction. On cutting down the X dimension of the crystal until it is about seven times the thickness the waves become very strong so that the voltages generated by their reflections are of readily observable magnitude. Upon cutting down the X axis still further the surface waves become weaker. The factor of seven is not extremely critical; anywhere from six to eight is satisfactory for most commercially used metals.

If the Y-cut crystal is held against a metal surface, preferably with a film of oil between of a viscosity incapable of transmitting any substantial shearing stress at the frequency used, strong surface waves but only very feeble shear waves are produced in the metal, because the oil is not a good transmitter of shearing stress even at supersonic frequencies. In pure shear the lower face of the crystal is executing a rocking motion which is quite potent in the radiation of surface waves in which the surface motion is around in an elliptical orbit. Since the crystal is used on an oil film of relatively low viscosity, in relation to the rigidity of the material and the frequency used, it is probably only the vertical component of this rocking which is of importance in radiating the surface waves. If, however, the crystal is cemented to the metal part by means of heated flake shellac or with plaster of Paris, or affixed thereto with a highly viscous oil or similar medium, a beam of very strong shear waves is radiated into the metal. In fact the voltage generated by the reflections of the shear waves is of the same order of magnitude as that obtained with compressional waves radiated by X-cut crystals. If the cement or bond is rigid, surface waves of appreciable magnitude would not be produced. As shown in Fig. 4, the line of the vibration in the shear wave is parallel to the direction of the X axis in the Y-cut crystal. As mentioned above, it can be determined whether the metal is isotropic by noting whether or not the velocity of shear wave propagation is constant as the crystal is rotated about the Y axis.

The Y-cut crystals used for radiating shear waves usually have principal faces whose dimensions are large in comparison with the thickness of the crystal. The faces are usually from 0.4 inch square to 1 inch square, the thickness being of the order of .02 inch depending on the natural frequency desired.

In Table III the conditions for radiating strong longitudinal, shear, or surface waves are set forth.

Table III.—Summary of conditions for the radiation of different wave types

| Wave Type | Crystal Cut | Face Dimensions | Attachment to Metal |
|---|---|---|---|
| Longitudinal | X | Large | Oil. |
| Shear | Y | Large | Cement or medium of high viscosity. |
| Surface | Y | X=7×thickness | Oil of medium or low viscosity. |

Thus, if the crystal is large and is affixed to the part with cement or a highly viscous material which will transmit shearing stresses, then strong shear waves will be radiated into the part and only weak surface waves will be radiated over the surface of the parts; if the surface waves are disturbing they can be reduced to negligible magnitude or eliminated by rigidly securing the crystal to the surface of the part or by placing energy absorbing material (Fig. 11), such as lead or some non-elastic material, against the surface of the part around the wave generating crystal. For instance, in Fig. 11 a lead ring surrounds the crystal and absorbs any surface waves that are radiated laterally by crystal 10. The crystal is fastened to the material by an oil-molasses mixture and the resulting shear wave trains, vibrating in planes normal to their direction of propagation, travel back and forth through the material in the direction indicated by the arrows. If the crystal is of the proper proportion with relation to the length of the wave generated and is affixed to the part by an oil film of low viscosity (such as to be incapable of transmitting any material shearing stresses under the conditions present) or by means which provides for lateral movements of the crystal face relative to the surface of the part, then strong surface waves will be radiated and no appreciable shear waves. Depending upon the nature of the crystal vibrating circuit, surface or shear waves may be radiated continuously or as trains as disclosed in the supersonic reflectoscope apparatus of my Patent No. 2,280,226.

Fig. 5 shows an arrangement for radiating and detecting surface waves in an elastic solid. A sending crystal 10, cut as shown in Fig. 2, is placed on a surface of the material 12, with an XZ face in contact therewith. While the crystal may be merely held against the surface or retained thereon by a weight, I have found it of advantage to affix the crystal to the surface by means of a thin film of lubricating oil. A drop of oil is placed on the surface and the crystal placed thereon with light pressure. This method increases the convenience of use and inhibits the radiation of shear waves down into the body of the material. Longitudinal waves are not radiated because the crystal is vibrating in shear and not longitudinally. In other words, substantially only surface waves are generated. For oscillating the crystal, an alternating potential, which is preferably a "voltage train," is generated by oscillator 14 and applied across the crystal through electrode 16, the material 12 forming the other electrode in the arrangement shown. The oscillator may be tuned to the natural frequency of the crystal, for maximum power transmission. As a variation, two electrodes 16 could be applied to the two XZ faces of the crystal (Fig. 6), with either of the XZ faces contacting the material through one of the electrodes. A further variation (Fig. 7) comprises affixing a YZ surface of the crystal to the material, the conducting electrodes remaining on the XZ surfaces; this arrangement will also generate surface waves. Of course, where the YZ face is the material contacting face then the Y dimension of the crystal should be within the range given above of from substantially one to ten times the wavelength of the surface wave generated. Another variation (Fig. 10) comprises supporting the crystal at an angle, with one long edge of a YZ face in contact with the material, and inserting a drop of oil 60 into the angular space thus formed between the YZ face and the material, the electrodes being on the XZ faces.

Surface waves generated by the sending crystal may be detected by receiving crystal 18 affixed to the surface in a similar manner and preferably being of like dimensions and orientation as the sending crystal. The waves passing over the surface will rock and shake this receiving crystal and strain or distort the same to produce a potential thereacross which will vary in frequency and amplitude as the frequency and amplitude of the surface waves. High frequency amplifier 22 is connected to electrodes (such as 20 and the material 12) across crystal 18 for amplifying the potential produced therein by the surface waves to operate a measuring or indicating apparatus, such as oscilloscope 24. If desired, the output of the receiving crystal may be rectified before application to the measuring or indicating instrument. In the arrangement of Fig. 5, the output of amplifier 22 is connected to one set of plates of oscilloscope 24 while oscillator 14 is connected to the other set of oscilloscope plates. Thus, if the motion caused in the receiving crystal 18 by the surface waves is approximately in phase with the motion produced in crystal 18 by the oscillator, a figure having a substantially elliptical shape will be formed on the oscilloscope screen. If crystals 18 and 20 are then moved relatively in the direction of wave propagation, for instance by a calibrated screw or micrometer 30 (Fig. 8) the ellipse will roll over once each time the crystals are relatively moved a distance equal to one wavelength. By counting a large number of wavelengths in this manner and reading the corresponding distance on the calibrated screw, the length of each wave may be accurately determined. The frequency being known from the calibration of the oscillator or otherwise, the velocity of propagation of the waves may be found from the relation $V=Lf$ and in turn the density or modulus of rigidity of the material may be computed from the velocity of propagation of the wave, by an equation such as that given above, wherein the velocity of a surface wave is given in terms of the density and modulus of rigidity of the material.

Another method of measuring the velocity of surface waves propagated according to my invention is by utilizing the apparatus described in my Patent No. 2,280,226, and observing the time required for a surface wave train to travel a measured distance, or to be reflected back to the point of emission from a reflector at a known distance. This direct method of observation is not as accurate as the method described above but is more rapid.

Fig. 12 shows a voltage train oscillator eminently suitable for this purpose, as well as for testing with shear wave trains. The train oscillator here shown is that particularly described in connection with Fig. 4 of my Patent No. 2,398,701 dated April 16, 1946. Voltage trains from this generator are applied to the Y-cut crystal 10 and simultaneously to the vertical sweep plates of the oscilloscope 24. Reflections of each resulting mechanical surface or shear wave train, radiated into a part associated with crystal 10 in the manner described herein, are indicated on the oscilloscope as potential variations created across the crystal by the reflected mechanical wave train, in the interval following each voltage train. Horizontal and vertical sweep oscillators are provided as shown and may be arranged in a known manner to provide timing marks (which may be selected to indicate "inches" in a given material), on the oscilloscope screen, to form an oscilloscope screen pattern as schematically shown in Fig. 13, the timing marks being indicated at 70. When surface or shear wave trains are being radiated and received by crystal 10 then the trace on the oscilloscope screen appears somewhat as shown in Fig. 14, the initial voltage wave being indicated at 80, a reflection from an end face of the material at 82, and a reflection from a crack or flaw in the material at 84. In the trace of Fig. 14, the voltage trains have been rectified before being impressed on the oscilloscope plates.

A typical mounting for crystal 10 is shown in Fig. 9. The crystal 10 is attached to Bakelite block 40, which is mounted in the metal shell 42 which forms a separable connector attachable to a shielded or co-axial cable leading to the generating and amplifying system. The spiral spring 46 grounds the metal parts being inspected and thereby grounds the outer electrode of the quartz plate. The inner electrode may be connected to a lead 44 from the conductor of the cable. Bakelite is used as the backing material because the supersonic waves do not travel through it and produce reflections from the back side of the crystal. When the crystal is cemented flat against the Bakelite block, it is comparatively highly damped and, therefore, of low sensitivity although useful for observing successive reflections in thin plates. Reduced damping can be obtained by turning concentric annular grooves in the face of the Bakelite one or two millimeters apart so that a diminished area of contact with the Bakelite is achieved although the crystal is supported rather uniformly. When working for maximum sensitivity and working with long bars of material where resolution of close-lying reflections is not of importance, the crystal may be used with no damping on the back side, connection being made to it through a small flexible wire. Five megacycle crystals of the order of ⅛ inch width seem to have a considerable inherent damping and are sometimes used with the minimum damping from the Bakelite support by having the Bakelite contact the face of the crystal only around its outer rim.

If the surface into which the waves are to be transmitted is curved, the crystal can be ground to fit this curve, its back face being ground to a similar curve to keep the crystal at uniform thickness. The damping surface must, of course, then be of similar curvature.

In utilizing my supersonic surface waves in testing and inspecting materials, surface waves or wave trains generated by a sending crystal are propagated over the surface of said material and are then detected and measured, for instance by a receiving crystal as shown in Fig. 4, or by utilizing the sending crystal to receive reflections of each surface wave train in the interval between the radiation of individual trains.

If the surface material is in a spongy condition, as is cast iron containing inclusions of free graphite, then surface waves of short wavelength will be attenuated very rapidly with distance and the output of amplifier 22 will read lower than with sound continuous metal. If longer wavelengths are employed, they will not only penetrate deeper below the surface as explained above, but they will flow around inclusions whose linear dimensions are small compared with the wavelength. Thus, by determining and comparing the attenuation of surface waves of varying wavelengths (and consequently different frequencies) both the extent in depth of the spongy condition and the approximate dimensions of the inclusions can be determined.

If the material is not isotropic, in that it may have different properties in different directions, this condition may be ascertained by determining the velocity of propagation or attenuation of surface waves in different directions over the same portion of the surface. Since the velocity of propagation of surface waves depends largely on the modulus of rigidity about an axis normal to the direction of propagation, any variation in the modulus of rigidity about axes in different directions can be determined by observing the variations in the velocity of surface waves propagated in different directions. Because lack of elastic isotropy may be due to the material having been fatigued by being subjected to repeated stresses, the incipient fatigue of the material may be detected prior to actual failure by comparing the velocity of surface waves along and at right angles to the direction in which the fatiguing stress was applied. Rolling of the material in one direction during manufacture will result in a lack of elastic isotropy and so the direction of rolling may be similarly determined.

If the material has a crack or flaw 26 (Fig. 5) lying near the surface, this will interfere with the propagation of the waves to the pickup crystal 18, or "cast a shadow," and may be thus detected. For this purpose it may be desirable to make the Z dimension of the receiving crystal of less extent than the Z dimension of the sending crystal. A better method of detecting cracks, however, consists in observing the waves reflected from the crack. The crystal 18 is placed near crystal 10 so as to be in position to receive reflected waves, or better still, the reflected waves are picked up by crystal 10 itself. In order to observe the reflected waves with the sending crystal it is best not to energize that crystal with continuous oscillations but to energize it with a "voltage train" consisting of but a few oscillations. Thus, a "wave train" is sent out and the crystal is no longer being energized by the oscillator when the reflected waves arrive back at the crystal. The amplifier is connected to the crystal and permits the receipt of the reflected wave train to be indicated on the oscilloscope. The details of this method of producing voltage trains and utilizing them for observing reflections, are set forth in my Patent No. 2,398,701, filed June 23, 1942; and my Patent No. 2,280,226. The size and position of a flaw may be determined by varying the wavelength of the surface wave to indicate the size and depth of the flaw and by varying the positions of the crystal or crystals to show its location in the plane of the surface and shape. By "crack or flaw" I refer to all surface irregularities inasmuch as surface waves will be reflected or altered upon encountering any fairly abrupt change of elasticity or density or departure in the form of the surface from a smooth contour.

In sheet material, the wavelength can be chosen so that the surface wave penetrates fairly well to the opposite surface of the sheet; in this case, cracks or flaws can be detected by reflection even though they lie inside or on the back surface of the sheet.

When surface waves of fairly short wavelength are transmitted over a machined metal surface, the many minute scratches, due to the machining, reflect the surface waves and consequently cause an attenuation of wave intensity with distance. The amount of this attenuation at either one or a plurality of wavelengths may be used as a measure of the roughness of the surface. As an alternative, the reflection of the waves back in the direction of the sending point can be measured; the rougher the surface, the stronger the reflections at a given wavelength.

It is also possible to utilize shear waves for indicating an aelotropic condition in a material. In order to generate shear waves in a material a Y-cut crystal is cemented to the surface of the material or attached thereto with a film of highly viscous oil, or a similar medium which is capable of transmitting sufficient shearing stress from the crystal face to the material to shake the surface particles of the material laterally and cause shear waves to be propagated through the material. For instance if a metal plate is lying horizontally shear waves can be propagated downwardly through it by cementing a Y-cut crystal to its top face; the Y crystal axis will then be vertical. If the X axis extends in a north-south direction (the Z axis extending east-west), then a beam of shear waves of cross-section approximately equal to the crystal face area and having a plane of vibration extending north-south, in a direction of the X axis, will be propagated downwardly through the material when an alternating potential from a wave train generator is applied across the two XZ faces. The train generator may be that disclosed and claimed in my Patent No. 2,280,226 and Patent No. 2,398,701, dated April 16, 1946. If the crystal is detached and again cemented to the material with its X axis east-west, and energized in a similar manner, the plane of vibration of the resulting shear waves will also be east-west, in a direction of the X crystal axis. By measuring the time interval between the sending of the wave train and its arrival back at the sending crystal the wave train velocity for each of these crystal orientations may be determined or compared in the manner described in Patent No. 2,280,226.

Because the velocity of propagation of shear waves depends not only upon the direction of wave propagation but also upon the alignment or orientation of the plane of vibration of the wave relative to the material, a difference in the shear wave velocity between the two crystal positions mentioned above, or broadly for different crystal positions, will indicate elastic aeolotropy in the material and the amount of such velocity difference will be an indication of the amount of said aeolotropy.

This determination of elastic aeolotropy (by either shear or surface waves) may be utilized for observing any property of the material which, in turn, results in elastic aeolotropy. For instance, if the plate in question is stressed or tensioned, which produces elastic aeolotropy, the amount of this tension may be measured by measuring the difference in velocity between respective shear or surface waves sent through it as mentioned above. This method of observation may be used for detecting internal stresses in parts which have not been relieved by annealing, etc. The rolling of the material in a specified direction will produce aeolotropy and hence may be so detected.

As used in this application the term surface wave refers to that type of wave motion involving movement of particles at the surface of a material as described above and illustrated in Fig. 1 of the drawing, and as distinguished from a longitudinal or a shear wave travelling in a direction parallel to the surface adjacent thereto.

It is to be understood that the invention is not limited to the specific embodiments herein illustrated and described, but may be used in other ways without departure from its spirit as defined by the following claims.

I claim:

1. In a solid material inspection apparatus, a supersonic mechanical wave generating device comprising, a Y-cut quartz crystal, electrical means for subjecting said crystal to an oscillating electric field in the direction of the Y axis of said crystal to cause the XZ faces of said crystal to vibrate with respect to each other about a node within said crystal at a supersonic frequency, and means for transmitting said movements of at least one of said XZ faces to the material to be inspected, said transmitting means including a liquid lying between said crystal and said solid material and connecting said crystal face with said material.

2. In a material inspection apparatus, a supersonic mechanical shear wave generating device comprising, a Y-cut quartz crystal, electrical means for subjecting said crystal to an oscillating electric field in the direction of the Y axis of said crystal to cause the XZ faces of said crystal to vibrate with respect to each other about a nodal plane at a supersonic frequency, and means for transmitting said movements of at least one of said XZ faces to a portion of the material to be inspected, said transmitting means including a medium having a viscosity which is sufficiently high relative to the rigidity of said material and the frequency of said vibration as to transmit shearing stresses from said crystal to said portion to shake said portion laterally and cause shear waves to be propagated through said material, said medium lying between and connecting said crystal and said material.

3. In a material inspection apparatus, a supersonic mechanical surface wave generating device comprising, a Y-cut quartz crystal, electrical means for subjecting said crystal to an oscillating electric field in the direction of the Y axis of said crystal to cause the XZ faces of said crystal to vibrate with respect to each other about a nodal axis at a supersonic frequency, and means for transmitting said movements of at least one of said XZ faces to a surface portion of the material to be inspected, said transmitting means including a medium having a viscosity which is sufficiently low relative to the rigidity of said material and the frequency of said vibration as to be incapable of transmitting any material amount of shearing stress from said crystal to said surface portion to enable said XZ crystal face to vibrate in substantially pure shear and cause the particles of said surface portion to move in substantially elliptical orbits and propagate surface waves over the surface of said material, said medium lying between and connecting said crystal and said material.

4. A method of testing an elastic material for aeolotropy comprising, attaching an XZ face of a Y-cut quartz crystal to a surface portion of said material by a means capable of transmitting shearing stress, energizing said crystal with an oscillating electrical wave train to cause said crystal to vibrate in shear at a supersonic frequency and shake said surface portion to cause shear waves to be propagated through said material, and measuring the relative velocities of the resulting shear wave components with respect to different elastic axes of said material.

5. A method of measuring elastic aeolotropy of a part comprising, transmitting through said part a first supersonic vibration shear wave having a line of vibration oriented in a definite direction relative to said part, transmitting through said part a second supersonic vibration shear wave having a line of vibration oriented in a different direction relative to the orientation of said first shear wave, and comparing the velocities of said first and second shear waves.

6. In a material inspection apparatus, a supersonic mechanical wave generating combination comprising, an elastic solid material, a Y-cut quartz crystal having an XZ face thereof in effective contact with said material, and electrical means for subjecting said crystal to an oscillating electric field in the direction of the Y crystal axis.

7. A method of producing surface waves in an elastic solid material comprising, electrically vibrating an electromechanical transducer to cause at least a portion of said transducer to rock and shake at a supersonic frequency, and transmitting said movements of said portion of said transducer to a surface portion of said material to cause said surface portion to move relative to the body portion of said material and propagate supersonic surface waves which travel over the surface part of said material, while at the same time providing for substantially free rocking and shaking movements of said transducer.

8. In a method of producing surface waves in an elastic solid material, the steps comprising, electrically vibrating an electro-mechanical transducer to cause a wall of said transducer to rock and shake at a supersonic frequency, and transmitting said movements of said wall to a surface portion of said material to cause the said surface portion to rock and shake, relative to the body portion of said material, to propagate surface waves which travel over and are confined to the surface part of said material, said wall of said transducer being maintained in motion transmitting contact with said surface portion of said material and being dimensioned in predetermined relation to the frequency of said transducer movements and the velocity of said surface waves so that said material contacting wall is substantially from one to ten times as long in the direction of wave propagation as the wavelength of said surface waves.

9. A method of generating in an elastic solid supersonic waves which are propagated over and confined to the surface part of said solid which comprises, exciting by an oscillating electric field a piezoelectric crystal to cause a face of said crystal to vibrate at a supersonic frequency with a lateral and angular motion which is similar to the motion of a surface over which surface waves are passing, and transmitting said vibratory motion of said crystal face to a surface portion of said solid to cause the particles composing said surface portion to vibrate in a generally elliptical path and propagate surface waves over the surface part of said material.

10. A method of generating in an elastic solid supersonic waves which are propagated over and confined to the surface part of said solid which comprises, exciting by an oscillating electric field a piezoelectric crystal to cause a face of said crystal to vibrate at a supersonic frequency with a lateral and angular motion which is similar to the motion of a surface over which surface waves are passing, and contacting said crystal face with a surface portion of said solid in such manner as to transmit said vibratory motion of said face to said surface portion so that the particles composing said surface portion are caused to vibrate in a generally elliptical path relative to the body portion of said material, said contacting face of said crystal being substantially from 1 to 10 times as long in the direction of wave propagation as the wavelength of the surface waves radiated by said crystal.

11. A method of generating supersonic surface waves, comprising, electrically vibrating a Y-cut quartz crystal relative to the body portion of a material having an elastic surface part at a supersonic frequency in substantailly pure shear about the Z crystal axis, and transmitting the vibratory movements of said crystal to said material to cause a portion of said elastic surface part of said material to vibrate in response to and in accordance with said crystal vibrations.

12. In a method of propagating surface waves over the surface part of an elastic material, the steps comprising, electrically stressing a Y-cut quartz crystal with an oscillating electric field in the direction of the Y crystal axis to cause a portion of said crystal to vibrate at a supersonic frequency with a combined rocking and shaking movement, and contacting said portion of said crystal with a surface portion of said material in a manner to cause the particles in said surface portion to vibrate in a generally elliptical orbit, relative to the body portion of said material.

13. The method of claim 12, in which said crystal has an XZ face, which is a material contacting face.

14. The method of claim 12, in which said crystal has a YZ face, which is a material contacting face.

15. The method of claim 12, in which said crystal has an XZ face, which is a material contacting face and the X dimension of the crystal is from two to fifteen times as great as the Y dimension of the crystal.

16. The method of claim 12, in which said crystal has an XZ face, which is a material contacting face and the X dimension of the crystal is approximately seven times the Y dimension thereof.

17. The method of claim 12, wherein the crystal is affixed to the surface of the material by means of a thin film of liquid.

18. In a method of producing supersonic surface waves in a solid material, the steps of affixing a Y-cut quartz crystal to said material by means of a liquid film, the material contacting face of the crystal being of from substantially one to ten times the length of the surface wave produced in the direction of propagation of said wave, and applying a high frequency alternating potential across said crystal.

19. In apparatus for producing supersonic surface waves in an elastic solid material, an oscillatory voltage generator, a piezoelectric crystal, means for energizing said crystal by said oscillatory voltage to cause it to vibrate essentially in pure shear, and means for transmitting said pure shear movements of said crystal to a surface portion of said solid without materially affecting the nature of said crystal vibration.

20. Means for producing supersonic surface waves in a material having an elastic surface part comprising, an oscillating voltage generator, a quartz plate having the X, Y, and Z crystal axes thereof lying respectively in the direction of the width, thickness, and length of the plate, means for applying the voltage produced by said generator to the two XZ faces of said plate, and means for mounting said crystal to enable the resulting vibrations of said plate to be transmitted to a surface portion of said material while at the same time providing for substantially free vibratory movement of said crystal both laterally and angularly about the Z crystal axis.

21. The means of claim 20, wherein a face of the plate which is perpendicular to the Y axis is in effective mechanical contact with said material.

22. The means of claim 20, wherein a face of the plate which is parallel to the Y axis is in effective mechanical contact with said material.

23. Means according to claim 20, wherein an XZ face of the plate is a wave generating face and the X dimension of the plate is from about one to about ten times the wave length of the surface waves generated by vibrations of said plate.

24. Means according to claim 20, wherein a YZ face is a wave generating face and the Y dimension of the plate is from about one to about ten times the wave length of the surface waves produced by vibrations of said plate.

25. Means according to claim 20, wherein the X dimension of said plate is between about two to about fifteen times the Y dimension thereof.

26. A supersonic surface wave generating device for material inspection apparatus, comprising a Y-cut quartz crystal and means for mounting said crystal and means for electrically stimulating said mounted crystal to cause it to vibrate mechanically in substantially pure shear about its Z axis at a supersonic frequency.

27. In a method of inspecting a metal for surface inhomogeneities, the steps comprising, vibrating a surface portion of said metal with a combined rocking and shaking motion to cause supersonic surface waves to be propagated over the surface part of said metal, and measuring a characteristic, such as wave attenuation or wave velocity, of the propagation of said surface wave over said surface part.

28. The method of claim 27, in which said surface wave characteristic is measured at each of a plurality of surface wave lengths.

29. The method of claim 27, in which surface wave trains are propagated and a characteristic thereof is measured by observing reflections of said trains from surface irregularities in said material.

30. In apparatus for testing and inspecting material, an oscillating voltage generator, means energized by said generator for producing surface waves in said material, means responsive to said surface waves for generating a second oscillating voltage, means for relatively moving said surface wave producing means and said surface wave responsive means by measured amounts, and means for indicating confluences of phase between said second oscillating voltage and the voltage energizing said surface wave producing means.

31. In an apparatus for testing and inspecting materials, an oscillating voltage generator, a piezoelectric crystal energized by said generator and being so cut, mounted and energized as to vibrate substantially in pure shear, means for transmitting vibrating movements of said crystal to the surface portion of said material for generating surface waves therein which travel along the surface of said material and which comprise particle vibrations in generally elliptical orbits, and a second piezoelectric crystal adapted to be actuated by said surface waves to produce an oscillating voltage corresponding to said surface waves.

32. The apparatus of claim 31, wherein at least one of said crystals is a Y-cut quartz crystal.

33. The apparatus of claim 31, wherein at least one of said crystals is a Y-cut quartz crystal having the X dimension thereof from about two to about fifteen times the Y dimension thereof.

34. In an apparatus for testing and inspecting the surface portion of solid material, an oscillator, a Y-cut quartz sending crystal having an XZ face contacting a surface of said material and energized by said oscillator, a second Y-cut quartz receiving crystal having an XZ face contacting said surface, an oscilloscope, and means electrically connecting said oscilloscope to said oscillator and to said receiving crystal.

35. A surface inspection assembly comprising, an elastic solid material, a Y-cut quartz crystal, and means for mounting said crystal relative to a surface portion of said material and for energizing said mounted crystal to cause said crystal and said surface portion to vibrate together, in synchronism, relative to the body portion of said material with a combined lateral and angular movement so as to cause surface waves to be propagated over the surface part of said material.

36. In an apparatus for testing and inspecting an elastic solid material, an oscillator, an oscilloscope, a Y-cut quartz crystal having an XZ face contacting a surface of said material, and means electrically connecting said crystal to said oscillator and to said oscilloscope.

37. In a method of inspecting the surface portion of a solid material for elastic isotropy, the steps of, transmitting through said surface portion a first supersonic vibration surface wave having a definite direction of wave propagation, transmitting through said surface portion a second supersonic vibration surface wave having a different direction of wave propagation relative to the direction of wave propagation of said first wave, and comparing the velocities of said surface waves.

38. In a supersonic electromechanical transducer, a Y-cut quartz crystal having an XZ face and adapted to be applied to an elastic solid material, and means for establishing effective mechanical contact between said XZ face and said material for transferring vibratory movements between said XZ face and said elastic solid material.

39. Apparatus for producing supersonic waves in solid elastic material; comprising an electromechanical transducer having a vibrating element a surface of which vibrates at a supersonic frequency with a vibratory motion consisting of a combination of translation, and of rotation in such manner that said surface does not remain parallel to any fixed plane; said surface or an edge thereof being adapted to be brought into effective mechanical contact with a surface of the material.

FLOYD A. FIRESTONE.

REFERENCES CITED

The following references are of record in the file of this patent:

UNITED STATES PATENTS

| Number | Name | Date |
|---|---|---|
| Re. 17,357 | Cady | July 2, 1929 |
| 1,693,806 | Cady | Dec. 4, 1928 |
| 1,802,780 | Sawyer | Apr. 28, 1931 |
| 1,802,781 | Sawyer et al. | Apr. 28, 1931 |
| 1,899,503 | Hansell | Feb. 28, 1933 |
| 2,164,125 | Sokoloff | June 27, 1939 |
| 2,173,589 | Mason et al. | Sept. 19, 1939 |
| 2,176,653 | Bokovoy | Oct. 17, 1939 |
| 2,275,256 | Fried | Mar. 3, 1942 |
| 2,280,226 | Firestone | Apr. 21, 1942 |

FOREIGN PATENTS

| Number | Country | Date |
|---|---|---|
| 54,683 | France | May 2, 1938 |
| 336,766 | Great Britain | Oct. 23, 1930 |
| 569,598 | France | Jan. 10, 1931 |